United States Patent
Stadlmayr et al.

(10) Patent No.: US 12,011,876 B2
(45) Date of Patent: Jun. 18, 2024

(54) SUPPORT SYSTEM FOR A PRODUCTION SYSTEM, AND WORKPIECE HOLDER FOR SAME

(71) Applicants: CADS Additive GmbH, Perg (AT); PETER LEHMANN AG, Baerau (CH)

(72) Inventors: Daniel Stadlmayr, Perg (AT); Wolfgang Hoeller, Perg (AT); Urs Hulliger, Baerau (CH)

(73) Assignees: CADS ADDITIVE GMBH, Perg (AT); PETER LEHMANN AG, Baerau (CH)

( * ) Notice: Subject to any disclaimer, the term of this patent is extended or adjusted under 35 U.S.C. 154(b) by 404 days.

(21) Appl. No.: 16/763,662

(22) PCT Filed: Nov. 8, 2018

(86) PCT No.: PCT/EP2018/080600
§ 371 (c)(1),
(2) Date: May 13, 2020

(87) PCT Pub. No.: WO2019/092098
PCT Pub. Date: May 16, 2019

(65) Prior Publication Data
US 2020/0361141 A1    Nov. 19, 2020

(30) Foreign Application Priority Data
Nov. 13, 2017 (EP) .................... 17201412

(51) Int. Cl.
*B29C 64/245* (2017.01)
*B22F 10/47* (2021.01)
(Continued)

(52) U.S. Cl.
CPC ............ *B29C 64/245* (2017.08); *B22F 10/47* (2021.01); *B25B 11/00* (2013.01); *B29C 64/153* (2017.08);
(Continued)

(58) Field of Classification Search
CPC ...... B22F 10/20; B22F 12/00; B22F 2999/00; B22F 2203/03; B22F 2207/20;
(Continued)

(56) References Cited

U.S. PATENT DOCUMENTS

2014/0191439 A1   7/2014  Davis
2015/0335434 A1   11/2015 Patterson et al.
(Continued)

FOREIGN PATENT DOCUMENTS

EP    1614501 A2   1/2006
EP    2386404 A1   11/2011
(Continued)

OTHER PUBLICATIONS

International Search Report, dated Jan. 11, 2019, from corresponding PCT application No. PCT/EP2018/080600.
(Continued)

*Primary Examiner* — Monica A Huson
*Assistant Examiner* — Kelsey C Grace
(74) *Attorney, Agent, or Firm* — NIXON & VANDEREHYE

(57) ABSTRACT

A support system includes a base support to be secured in a process chamber of a production system, and includes at least one positioning element. A workpiece holder has upper and lower faces. The workpiece support has at least one first positioning device. The positioning element and the first positioning device form a pin/hole pair. A section of the pin has a first thermal expansion coefficient. A section of the hole controlling positional accuracy has a second thermal expansion coefficient. In a first alternative, the second thermal expansion coefficient is lower than the first, producing a clamping effect between the pin and hole upon temperature increase of the support system. Alternatively, the first thermal expansion coefficient is lower than the second, produc-
(Continued)

ing a clamping effect upon temperature increase of the support system. The invention additionally relates to a method for producing a workpiece.

16 Claims, 6 Drawing Sheets

(51) Int. Cl.
*B25B 11/00* (2006.01)
*B29C 64/153* (2017.01)
*B33Y 10/00* (2015.01)
*B22F 10/28* (2021.01)
*B22F 12/00* (2021.01)
*B22F 12/30* (2021.01)
*B33Y 30/00* (2015.01)

(52) U.S. Cl.
CPC .............. *B33Y 10/00* (2014.12); *B22F 10/28* (2021.01); *B22F 12/226* (2021.01); *B22F 12/30* (2021.01); *B22F 2999/00* (2013.01); *B33Y 30/00* (2014.12)

(58) Field of Classification Search
CPC ... B29C 64/153; B29C 64/245; B29C 64/188; B29C 64/307; B33Y 10/00; B33Y 30/00; Y02P 10/25
See application file for complete search history.

(56) References Cited

U.S. PATENT DOCUMENTS

| 2016/0016371 A1* | 1/2016 | Sasaki ................... B22F 10/20 425/46 |
|---|---|---|
| 2016/0144428 A1 | 5/2016 | Mironets et al. |
| 2018/0169942 A1 | 6/2018 | Jessen et al. |
| 2020/0238615 A1 | 7/2020 | Staal et al. |

FOREIGN PATENT DOCUMENTS

| JP | 2004-162095 A | 6/2004 |
| JP | 2008073783 A | 4/2008 |
| JP | 2010-100884 A | 5/2010 |
| JP | 2010100883 A | 5/2010 |
| JP | 2016-508086 A | 3/2016 |
| JP | 2016-521315 A | 7/2016 |
| JP | 2018-530457 A | 10/2018 |
| JP | 2018-171775 A | 11/2018 |
| WO | 2016/184994 A1 | 11/2016 |
| WO | 2017/051029 A1 | 3/2017 |

OTHER PUBLICATIONS

Office Action issued in Japanese Patent Application No. 2022-010214 dated Oct. 18, 2022.

* cited by examiner

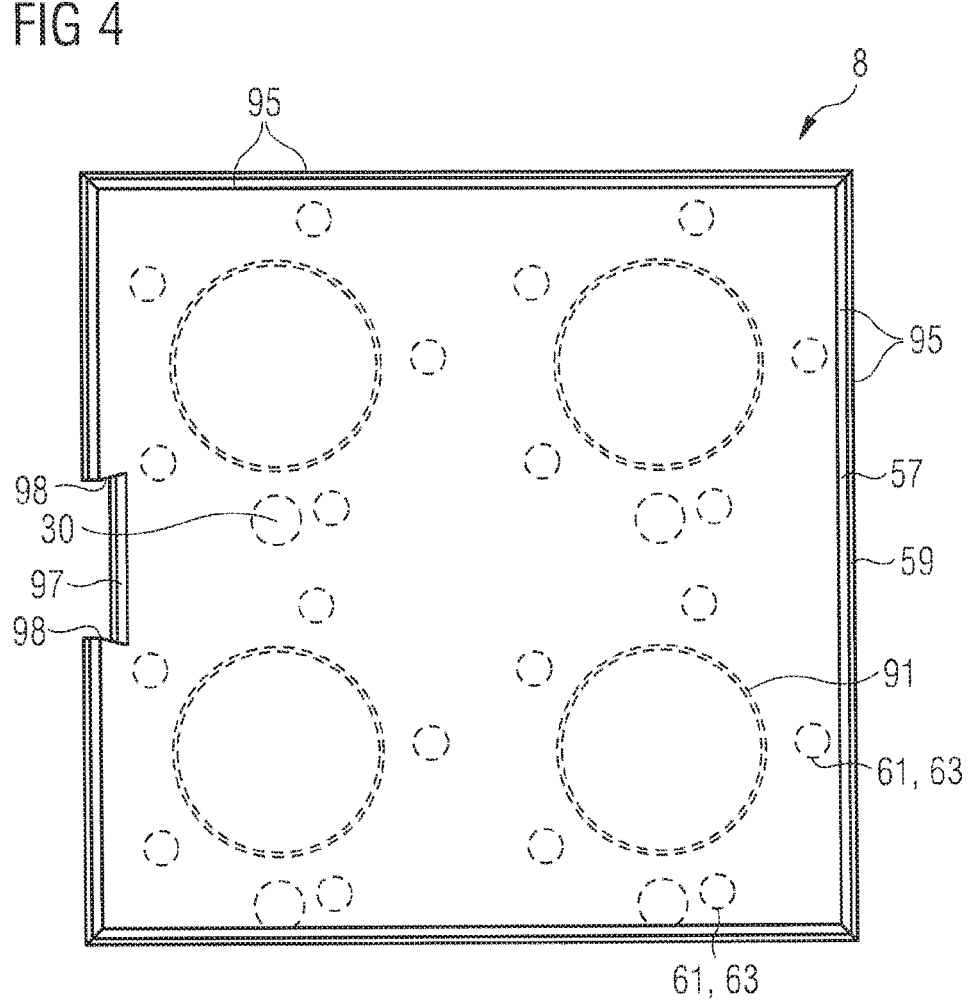

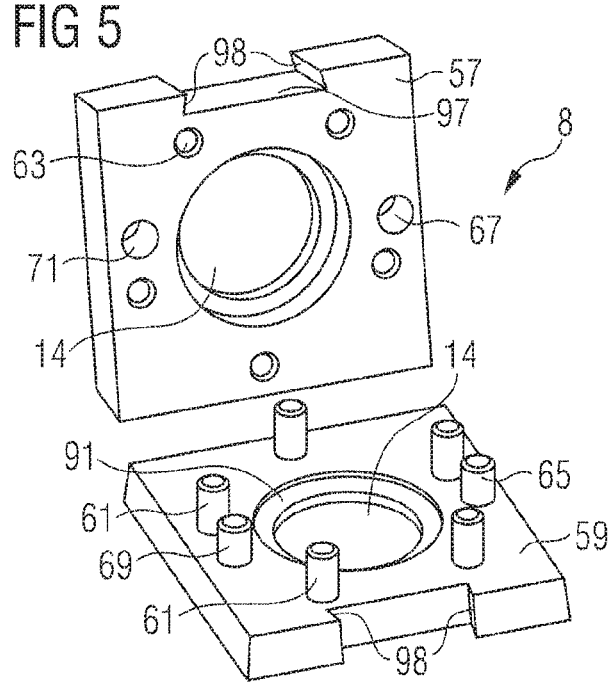
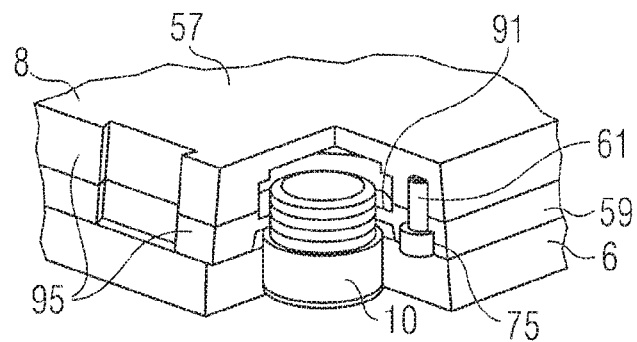
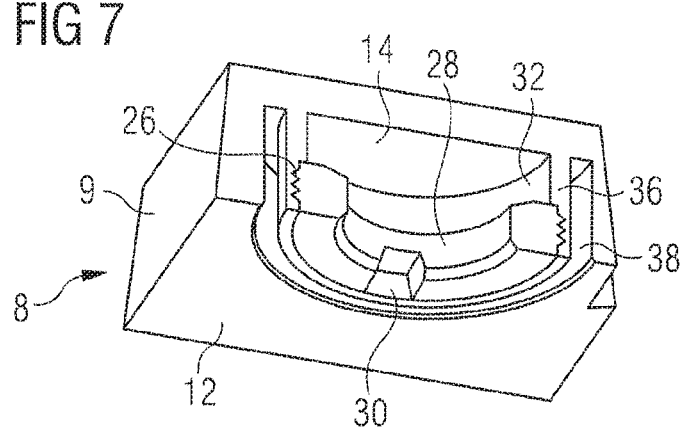

SUPPORT SYSTEM FOR A PRODUCTION SYSTEM, AND WORKPIECE HOLDER FOR SAME

BACKGROUND OF THE INVENTION

Field of the Invention

The present invention relates to a support system for a manufacturing system according to the preamble of claim 1 and to a workpiece holder for the same. The invention further relates to a manufacturing device comprising such a support system and to methods for producing a workpiece.

Description of the Related Art

In additive manufacturing, also referred to as "3D printing", a workpiece is built up step by step from a build material. To this end, in one variant, a powder of the build material is applied layer by layer to a building platform ("stage"). The powder is melted in a controlled manner by the input of energy. When the melted areas have solidified, the process is repeated until the workpiece is finished. The energy is e.g. applied by targeted irradiation with electromagnetic radiation, more particularly by means of a laser, or with particle radiation. The layered application of the powder is e.g. achieved by stepwise lowering of the building platform in a build cylinder. A device of this kind is e.g. known from EP-A-2 386 404.

For a precise, high-quality manufacture, the powder application has to be uniform and dense. In particular, local sagging of the build material during the manufacturing process has to be avoided. A possible reason therefor are small voids collapsing during the process. Irregularities in the respective uppermost layer result in structural defects of the manufactured workpiece.

Another aspect of the mentioned manufacturing process is a perfect seal of the building platform against the build cylinder so as to avoid losses of build material due to a leak in this seal to the space below the building platform. Also, such a material flow might result in undesirable irregularities of the applied build material layers.

A wide range of build materials is used in these additive manufacturing methods. Specifically, meltable or partly meltable materials such as polymers, more particularly thermoplastic polymers, metallic powders, ceramic powders are known.

After the completion of a manufacturing process and the removal of excess build material, the workpiece is firmly attached to the building platform at the contact surfaces and often also through support structures. The support structures serve to stabilize the position of the workpiece during the manufacturing process and to lead off generated heat to the building platform.

Such a workpiece produced in an additive manufacturing process is often in a condition where further process steps have to follow, e.g. thermal treatments or cutting (i.e. material-removing or subtractive) manufacturing processes. To this end it is necessary to remove the workpiece from the building platform in order to be able to apply these further process steps. Since the building platform is an integral part of the additive manufacturing device and since its removal therefrom is laborious, the removal of the workpiece from the platform has to take place on site, which is complex and generally requires manual labor. Moreover, a plurality of objects are produced simultaneously (e.g. up to 100), which makes it difficult to access the individual workpieces during their removal.

From the field of cutting manufacturing (turning, milling, grinding, etc.) it is known to arrange exchangeable workpiece holders, so-called pallets, on a base plate. The pallets are provided with matching fixing devices for the workpieces, recently also with so-called zero-point clamping systems where a displacement due to thermal expansion and a mechanical load applied to the pallet during machining relative to the center of the pallet is avoided. The pallets are locked on the base carrier by means of active fixing devices so as to withstand the loads during machining.

However, pallets of this type are not applicable in additive manufacturing processes, particularly not in those using powder applied in layers. In particular, they do not meet the specific requirements, namely compatibility with the build material so that the workpiece can be built up on their surface, a void-free coverage with powder and at the same time maximum utilization of the surface since additive manufacturing allows simultaneously producing a plurality of workpieces, on one hand, and a large number of simultaneously produced workpieces is a decisive factor with regard to profitability on account of the high time requirement, on the other hand, and dimensional stability on heating since in additive manufacture, any deformation of the building surface is directly transmitted to the workpiece due to the direct connection to the latter.

SUMMARY OF THE INVENTION

It is therefore an object of the present invention to provide a solution in the form of a support system, a workpiece holder, and associated methods that allows a more rational transfer of the workpiece from the manufacturing device for the additive manufacturing processes to a subsequent manufacturing process, more particularly a subsequent subtractive process (e.g. a cutting process) or a subsequent thermal process.

Such a support system is described in claim 1, and a workpiece holder is described in claim 2. Claims 15 to 19 each define a corresponding method for producing a workpiece. The further claims indicate preferred embodiments and a manufacturing device.

Numbers indicated in the following description and in the claims shall be understood to include the respective usual tolerances.

According to a first aspect, a support system for a manufacturing device and a workpiece holder for such a support system are provided. The support system comprises a base support (or base plate) that is designed to be secured in a process chamber of the manufacturing system and comprises at least one positioning element, and a workpiece holder on which a workpiece can be produced according to a manufacturing process comprising the layered application of a raw material in powder form. The workpiece holder has a lower side and a building side as its upper side which lies substantially opposite the lower side. On its lower side, the workpiece holder has at least one first positioning device for its releasable, positionally accurate attachment to the base support of the manufacturing device. The at least one positioning element and the at least one first positioning device are designed in a complementary manner and form a pin/hole pair. At least one section of the pin is made of a first material having a first thermal expansion coefficient, and a section of the hole that is decisive for the positioning accuracy is made of a second material having a second thermal expansion coefficient. In a first alternative, the second thermal expansion coefficient is lower than the first thermal expansion coefficient such that a clamping effect results between the pin and the surrounding hole in the event of a temperature increase of the support system during the manufacturing process due to the expansion of the section of the pin. In a second alternative, the first thermal expansion coefficient is lower than the second thermal expansion coefficient such that a clamping effect results between the pin and the surrounding hole in the event of a temperature increase of the support system during the manufacturing process due to the expansion of the retaining section of the hole.

The manufacturing system may e.g. be a manufacturing device of the additive kind (e.g. for selective laser melting). Also, the manufacturing system may be a manufacturing system for thermal post-processing of a workpiece or a manufacturing system for subtractive (e.g. cutting) manufacturing. The process chamber may be a space of the manufacturing system in which a respective manufacturing process (e.g. an additive manufacturing process) takes place. More particularly, the base support may be provided as part of a building platform of the manufacturing system. The base support may include fastening means that are suitable for fastening the base support to a base plate of the manufacturing system. Such fastening means may e.g. be holes, pins, and/or screws. In particular, the base support may be adapted to be screwed to a base plate of the manufacturing system.

The manufacturing process may e.g. comprise selective laser melting or selective laser sintering. The raw material in powder form may be a metal powder. The lower side and upper side of the workpiece holder may be provided as substantially plane surfaces of the workpiece holder and may define opposite sides of the workpiece holder. The building side may be suitable for manufacturing a workpiece according to the method comprising the layered application of a raw material in powder form thereon. The first positioning device may have a circular cross-section or a cross-section deviating from a circular shape. A plurality of first positioning devices (e.g. in the form of an arrangement of positioning devices) may be provided on the workpiece holder. Furthermore, a plurality of positioning elements (e.g. in the form of an arrangement of positioning elements) may be provided on the base support. A number of positioning devices may deviate from a number of positioning elements. The fact that the positioning element and the first positioning device are configured as a pin/hole pair may mean that either the positioning element is designed as a pin and the first positioning device as a hole or that the positioning element is designed as a hole and the first positioning device as a pin. In other words, the pin/hole pair is designed such that either the base support comprises the pin and the workpiece holder the hole, or the base support comprises the hole and the workpiece holder the pin. In a case where a plurality of pin/hole pairs is provided, the base support may comprise both pins and holes and the workpiece holder associated holes and pins. The fact that the positioning element and the first positioning device are complementary in design may mean that a cross-section of the positioning element substantially corresponds to a cross-section of the first positioning device. In other words, the pin may be received in the hole substantially without play.

The at least one section of the pin may be a positioning ring. The positioning ring may have a substantially annular shape. The positioning ring may e.g. be provided in the form of a disk-shaped ring. A thickness of the positioning ring may e.g. be constant. The at least one section of the pin may also be provided in the form of a cylinder. The thermal expansion coefficient may be a longitudinal expansion coefficient or a spatial expansion coefficient. According to the first alternative, the clamping effect can e.g. be achieved in that the section of the pin expands in the radial direction of the pin and thus entails a frictional and positive connection between the pin and the hole. According to the second alternative, the clamping effect may e.g. be achieved in that the retaining section of the hole expands in the (negative) radial direction of the hole, i.e. toward the pin, and thus entails a frictional and positive connection between the pin and the hole.

A positive connection may e.g. be achieved in directions parallel to the upper side and the lower side, and a frictional connection in a direction perpendicularly to the upper side and the lower side. When the support system cools down, the clamping effect may be released.

The workpiece holder may comprise a plate-shaped upper element and a plate-shaped lower element. The upper element may comprise the upper side and the lower element may comprise the lower side. The upper element may be formed of a different material than the lower element.

Hereafter, the lower element will also be referred to as the lower part and the upper element will be referred to as the upper part. Between the upper side and the lower side of the workpiece holder, there may be a boundary surface between the upper element and the lower element. On this boundary surface, the upper element and the lower element may contact each other in a planar manner. However, also a cavity or a plurality of cavities may be provided between the upper element and the lower element.

The upper element and the lower element are each plate-shaped. Also, on a boundary surface of the two elements, the upper element and the lower element may have identical cross-section surfaces (e.g. substantially rectangular cross-section surfaces). The upper element is formed of a different material than the lower element. For example, the upper element may be formed of a material that is suitable for producing a workpiece by means of the manufacturing process, more particularly by means of a (selective laser melting) process, on the same. The upper element may e.g. be formed of aluminum or an aluminum alloy. The lower element may be formed of a heat-resisting material. The lower element may e.g. by formed of a tool steel.

The lower element and the upper element may be detachably connected to each other. Thus, the lower and the upper element may e.g. be screwed to each other. Alternatively, the two elements may e.g. be connected to each other by other releasable fastening devices, e.g. by pegs or pins and associated holes, or by means of clamps.

Starting from the upper side, at least ¼ of the height of the workpiece holder may form the upper element, and starting from the lower side up to the upper element at most, the lower element may extend, in which at least part of the first positioning device is formed e.g. in the form of a hole. The upper element may e.g. form at most ¾ of the height of the workpiece holder, e.g. about half of the height of the workpiece holder.

The second material may exhibit at least one of the following two properties:
  heat resistant up to 550° C.,
  hardness in the range of 45 to 68 HRC (Rockwell hardness C).

The second material may furthermore be heat resistant up to 1000° C. The hardness of the second material may e.g. be comprised in a range of 50 to 55 HRC. This material may be tool steel. The entire lower element may e.g. consist of the material of which the first positioning devices consist in the retaining sections that are relevant for the positioning accuracy.

The first positioning device may substantially be a hole and the retaining section of the hole may substantially represent an annular portion of the inner wall of the hole. The retaining section may comprise at least one ring per hole that is pressed in or screwed in.

If the retaining section comprises a ring that is pressed in or screwed in, the ring may e.g. be formed of the second material and the remaining workpiece holder of another material. The other material may e.g. be a material that is suitable for producing a workpiece by means of the manufacturing process thereon.

Second positioning devices may be provided on the upper element and on the lower element and may be have a mutually complementary configuration so that the upper element and the lower element can be fastened to each other in a positionally accurate manner. The second positioning devices may have a set of at least two holes including a first hole and at least one second hole, the second hole being designed as an oblong hole so that a positioning pin of the second positioning devices inserted therein is displaceable in at least one direction in order to compensate for a thermal dimensional change of the upper element relative to the lower element. More specifically, the oblong hole may extend in a direction that substantially corresponds to a connection direction between the first and the second hole.

The first positioning device may represent a hole having a circular cross-section, while a second, eccentrically arranged recess is provided in the workpiece holder, or a hole having an elliptical, oval, or polygonal cross-section, so that the workpiece holder, when placed on the base support with at least one positioning element of a complementary configuration, is rotationally locked. In particular, the workpiece holder should be rotationally locked relative to the base support in a direction parallel to the upper side and the lower side of the workpiece holder. To this end, e.g. a polygonal cross-section of the first positioning device may be advantageous.

Lateral surfaces of the workpiece holder between the lower side and the upper side may be inclined so that the workpiece holder tapers from the lower side to the upper side. The inclined lateral surfaces ensure that clumping of build material in powder form due to compression by thermal expansion of the workpiece holder is avoided. Furthermore, the risk of voids being created in a build material in powder form applied to the workpiece holder is avoided. The inclination of the lateral surfaces may e.g. range from 1° to 11°, particularly from 3° to 9°, more particularly from 5° to 7° and e.g. amount to 6°.

At least one lateral surface of the workpiece holder may comprise at least one gripping means in the form of a groove or a ridge. The gripping means may extend from top to bottom, i.e. from the upper side to the lower side. The gripping means may be designed so as to allow a gripping device to engage the gripping means and to be fastened thereto, in particular by a frictional and/or positive connection, in order to be able to move the workpiece holder.

The gripping means may be designed in the form of a groove having a dovetail cross-section. Side walls of the gripping means may have respective undercuts of 10° to 40° and in particular from 15° to 20°.

The at least one positioning element may comprise a pin and the at least one positioning device may comprise a hole, the lower element being formed of the second material. The second material of the lower element may be tool steel.

According to a second aspect, a manufacturing device of the additive kind using a manufacturing process including the layered application of the raw material in powder form is provided which comprises a building stage and a support system according to the first aspect, the building stage of the manufacturing device comprising the base support of the support system. The base support may e.g. be screwed to a base plate so that the base support represents a part of the building stage of the manufacturing device.

The base support may comprise an arrangement of positioning elements, the arrangement of positioning elements including the pins of circular cross-section and additional rotational locking pins. Alternatively, the pins may have an elliptical, oval, or polygonal cross-section so that the workpiece holder is rotationally locked when placed on the base support. In particular, the workpiece holder should be rotationally locked in directions parallel to the upper side and the lower side of the workpiece holder.

According to a third aspect, a method for producing a workpiece is provided. The method comprises placing the workpiece holder of the support system according to the first aspect on the base support of the support system in a manufacturing device of the additive kind, the at least one positioning element comprising a pin and the at least one positioning device comprising a hole, and the pin engaging in the hole. The method further comprises carrying out an additive manufacture of a workpiece on the workpiece holder by the manufacturing device, the temperature of the support system increasing during the manufacturing process and a clamping effect arising between the pin and the surrounding hole due to the expansion of the section of the pin or the expansion of the retaining section of the hole, cooling the support system, whereby the clamping effect is released; disengaging the workpiece holder together with the workpiece produced thereon from the base support; and arranging the workpiece holder on a support of a system for the subtractive post-processing of the workpiece while a pin of the support engages in the hole of the workpiece holder.

The method may further comprise, prior to the step of arranging the workpiece holder on the support of the installation for subtractive post-processing: Arranging the workpiece holder on a support of an installation for thermal post-processing of the workpiece. The thermal post-processing may e.g. be a subsequent heat treatment. The material of the lower element of the workpiece holder may be heat resistant with respect to the heat generated by the installation. During thermal post-processing, the aforementioned clamping effect between the hole of the workpiece holder and a pin of a base support of the system for thermal post-processing can also be used.

The disengagement step may comprise: Gripping the workpiece holder by means of a gripper by a gripping means provided on a lateral surface of the workpiece holder. The gripping means may e.g. be a dovetailed groove.

A plurality of workpiece holders may be arranged side by side, possibly at intervals, on the base support of the manufacturing device. The arrangement may e.g. be such that an entire surface of the base support is covered with workpiece holders. In a manufacturing process, a workpiece may e.g. be produced on each of the workpiece holders.

According to a fourth aspect, a method for producing a workpiece according to a manufacturing process of the additive kind is provided. The method comprises determining a position and/or orientation of the workpiece to be produced relative to a workpiece holder on which the workpiece is additively manufactured while taking into account digital part data defining a geometry of the workpiece and while taking into account conditions defined by a subtractive post-processing of the workpiece, and carrying out the additive manufacture of the workpiece on the workpiece holder based on the determined position and/or orientation of the workpiece.

The method may e.g. be carried out by a control device of a manufacturing device of the additive kind. The method may also be provided by a central control device or a central computer configured to control both a manufacturing device of the additive kind and a device for subtractive post-processing. The control device and/or the computer carrying out the method may comprise a processor for carrying out the individual process steps and a memory in which program instructions for the individual process steps are stored. The digital part data may be CAD (computer aided design) data and more specifically a machine-readable CAD file. The method may comprise creating a machine control file for the additive manufacture based on which the step of carrying out the additive manufacture is implemented. The machine control file may include information on the determined position and/or orientation of the workpiece.

The method may further comprise: Determining a support geometry that includes at least one support structure for the workpiece while taking into account the conditions defined by the subtractive post-processing of the workpiece, the step of carrying out the additive manufacture including an additive manufacture of the support structure. The support structure may include one or a plurality of supports and/or columns for the workpiece, in particular for supporting the workpiece on the workpiece holder. The method may include creating a machine control file for the additive manufacture, the machine control file including and/or defining information on the support structure.

The conditions defined by the subtractive post-processing of the workpiece may include at least one of the following conditions: milling forces of the tools used for the subtractive post-processing, milling torques of the tools used for the subtractive post-processing, vibrations during the subtractive post-processing, attainability of the geometry of the workpiece and/or the support structure by the tools used for subtractive post-processing, machine kinematics of the tools used for the subtractive post-processing, tool geometry of the tools used for the subtractive post-processing, and tool linking of the tools used for the subtractive post-processing. The conditions may e.g. be stored in a memory and thus known to the machine implementing the method. The conditions may e.g. be provided in the form of parameters or numerical data.

The method may further comprise: configuring a possible building space of a manufacturing device for the additive manufacture of the workpiece.

The method may further comprise: Determining a layer thickness of the additive manufacture and/or determining an exposure strategy for the additive manufacture while taking into account the digital part data defining a geometry of the workpiece and while taking into account the conditions defined by the subtractive post-processing of the workpiece. In other words, both the layer thickness and the exposure strategy can be determined while taking into account the digital part data. The exposure strategy may e.g. define a position of multiple exposure paths.

The method may further comprise providing the support system according to the first aspect where the workpiece holder is the workpiece holder of the support system.

As explained above, workpiece holders according to the first aspect may distinguish themselves in that at least their surface on which a workpiece is produced by additive manufacture consists of a material on which this is possible. In the simplest case, the surface substantially consists of the material being used for the manufacture.

For their attachment to an accordingly equipped base plate in the manufacturing device, the workpiece holders according to the first aspect may be provided on their lower side with corresponding positioning devices, preferably holes. The workpiece holder can thus be arranged on the base plate which has positioning devices that are complementary to the positioning device, i.e. preferably pins.

In a preferred embodiment, a functionally essential part of the positioning devices on the workpiece holder consists of a material that is heat resistant (e.g. up to 500° C.) and/or hardenable or hardened. The workpiece holder can thus be exposed to a heat treatment together with the workpiece or withstand the loads caused by clamping during a cutting or material-removing treatment, respectively. A suitable material is tool steel.

Heat resistance means that sufficient mechanical properties, particularly strength, are still maintained at a predetermined higher temperature (e.g. 500° C. or 900° C.). As a parameter for heat resistance, the 0.2% yield point may be used, i.e. the stress that causes a reversible elongation of 0.2%. A 0.2% yield point of at least 10 MPa, preferably 20 MPa or even higher, according to the requirements, e.g. of 30 MPa or 40 MPa can be considered as the limit for heat resistance.

The positioning devices may be inserts that are screwed or pressed into holes in the body of the workpiece holder.

In a particularly preferred embodiment, an upper part (upper element) of a workpiece holder consists of a material that is compatible with the additive manufacture and a lower part (lower element) of a material that is suitably chosen for the positioning purposes, preferably of a tool steel.

For a uniform, dense, and void-free coating with powder that is used for the additive manufacture, the edges of the workpiece holders are beveled in a preferred embodiment so as to exhibit the overall shape of a truncated pyramid. The upwardly tapering shape, i.e. from the base plate upwards, results in a dense powder coating. In addition, correspondingly chosen angles of the lateral surface offer the advantage that in the event of dimensional changes as a result of a temperature change, more particularly an expansion, the powder can give way upwardly between adjacent workpiece holders or between the workpiece holder and the build cylinder.

One problem of the upwardly tapering shape of the workpiece holders is that they can no longer be seized by regular grippers since these can neither get a hold on the side walls nor engage under the workpiece holders. A preferred solution to this problem consists in providing a gripping groove having perpendicular or preferably slightly undercut side walls (dovetail groove) in the side wall. In such a groove, a gripper finds sufficient hold, particularly in the embodiment having undercut side walls where a positive connection is possible.

BRIEF DESCRIPTION OF THE DRAWINGS

The invention according to the aforementioned aspects will be further explained with reference to preferred exemplary embodiments and to the Figures showing:

FIG. 3 isometric view from below of three embodiments (3a, 3b, 3c) of workpiece holders of FIG. 1;

FIG. 4 top view of a workpiece holder of a first embodiment of a support system;

FIG. 5 3D view of an "unfolded" workpiece holder according to FIG. 4;

FIG. 6 cross-section through an arrangement of the workpiece holder according to FIG. 5 on a base plate;

FIG. 7 cross-section through a workpiece holder according to FIG. 3c with a second embodiment of the positioning device;

DESCRIPTION OF THE PREFERRED EMBODIMENTS

Figure 1:
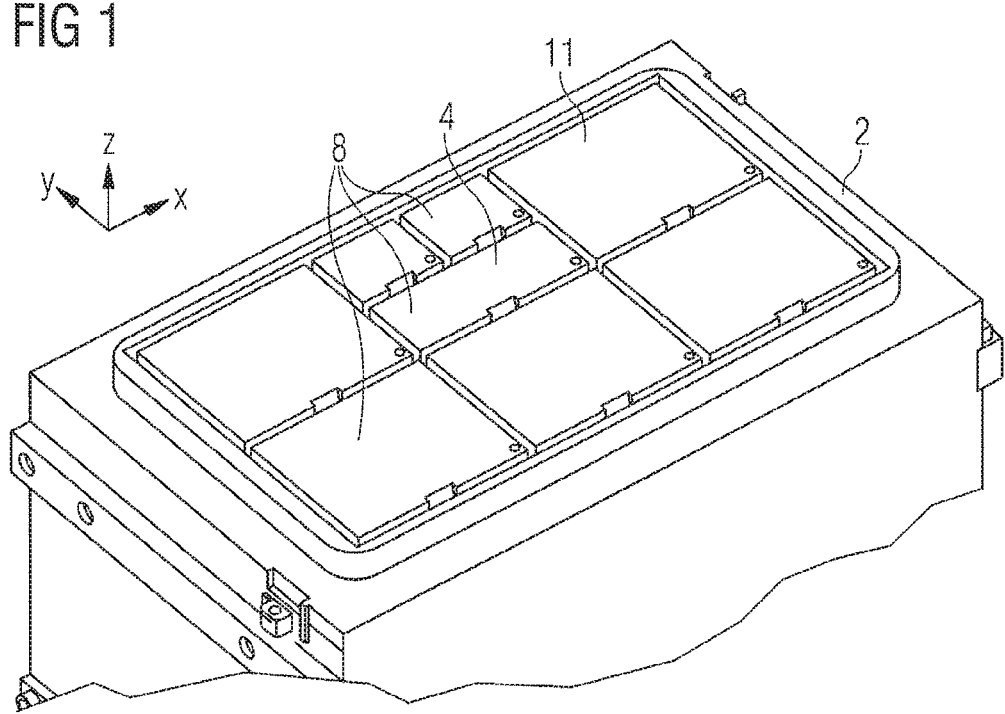
FIG. 1 isometric view of a build cylinder of an additive manufacturing system with workpiece holders.

FIG. 1 shows a schematic view of a build cylinder 2 of a machine for additive manufacture with building platform 4 that is vertically displaceable therein. Here, in particular, a laser melting method is considered where the building platform is coated layer by layer with a powder of the build material and in each newly applied layer the structures of the workpiece are produced by melting the powder by means of a laser.

Figure 2:
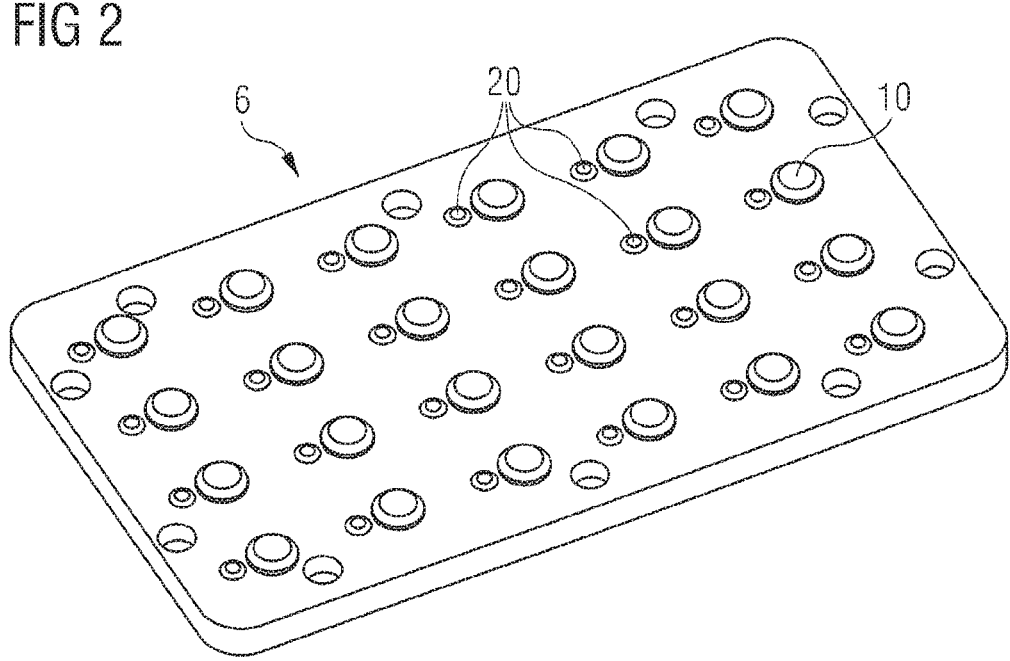
FIG. 2 isometric view of a base support for the manufacturing system according to FIG. 1.
Figure 3A:
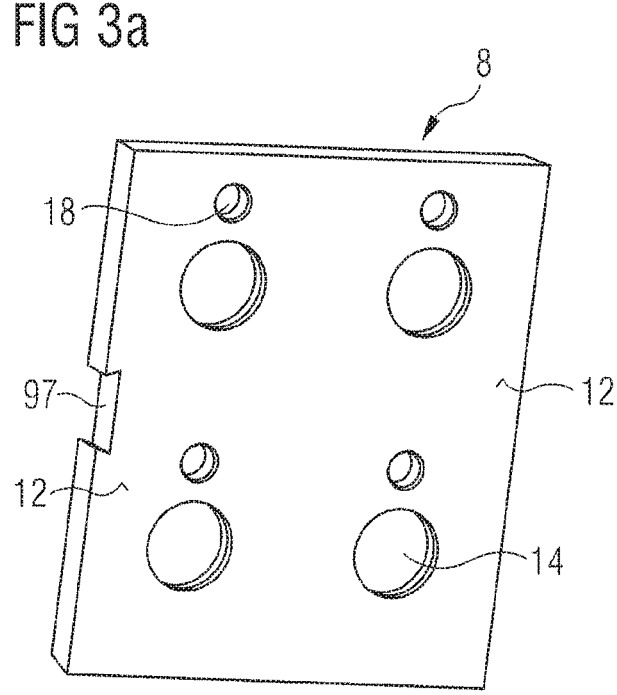
Figure 3B:
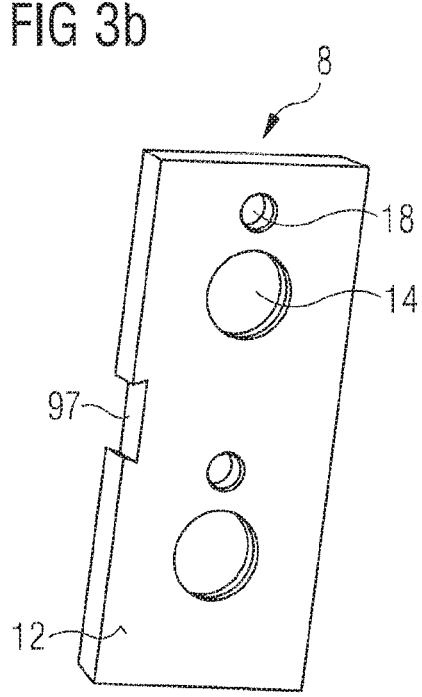
Figure 3C:
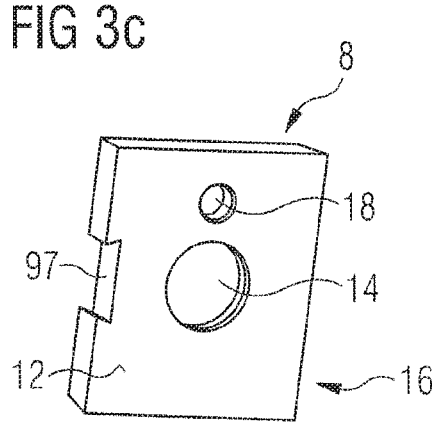

Building platform 4 comprises a base support or base plate 6 (not visible here, see FIG. 2) on which workpiece holders 8 or pallets 8 are arranged, optimally such that the entire surface of base support 6 is covered, as illustrated. In order to adapt to the size of the produced workpieces, pallets 8 of different sizes are used since as a guideline, one workpiece per pallet is produced, which however does not exclude the presence of an unused pallet or the manufacture of a plurality of workpieces on a pallet. Together with pallets 8, base support 6 forms a support system.

Base support 6 has pins 10 for the purpose of positioning pallets 8. On their lower side 12, pallets 8 have indentations 14 which in cross-section are complementary to pins 10 on at least a circumferential line so that pins 10 slide into recesses 14 with at best little resistance, but in any case with little play or virtually no play, and thus precisely maintain pallets 8 in position. The terms "recess" and "indentation" are used as synonyms herein and have the same meaning in the scope of this disclosure. For the smallest pallets 16, which have only one recess 14, it is advantageous or even necessary for an automatic placement on base support 6 to provide a rotational lock. In the present case, the latter consists of a smaller rotational locking recess 18 and of matching rotational locking pins 20 in base support 6.

Also, the rotational locking means may generally be provided in the form of raised portions that are shaped eccentrically with respect to pins 10 and of corresponding recesses in the lower side of pallets 8, as will be further explained below. Alternatives thereto are pins 10 having a shape other than circular symmetrical, e.g. of oval, elliptical, or polygonal cross-section, or another feature deviating from the circular symmetrical cross-section such as a radially projecting nose, or combinations of the aforementioned shapes.

At least on their upper side 11, pallets 8 according to the present exemplary embodiment show a material on which a workpiece can be produced by means of the additive manufacturing process. It is thus a material that is compatible with the respective build material. In the context of the manufacture of workpieces from metallic powders, such a material is e.g. an aluminum alloy.

Another difficulty in this regard is that the manufacturing process involves increased temperatures. For example, base support 6 is heated to a temperature of e.g. 200° C. Furthermore, the melting of the build material entails an additional energy input near surface 11, particularly in the initial phase, which leads to a local temperature increase. These increased temperatures cause thermal expansion effects. Nevertheless, at least the surface of the pallet needs to meet high requirements with regard to dimensional stability. Apart from dimensional changes in the xy plane, i.e. in parallel to upper side 11 (see FIG. 1), curvatures, i.e. deviations from a precisely plane surface due to temperature variations, and displacements in the xy plane due to the occurrence of play around pins 10 have to be avoided or at least reduced to an acceptable extent.

xy displacements are reduced in that recesses 14 consist of a material having a correspondingly low thermal expansion at least in the area that is decisive for the positioning. Tool steel is preferred for this purpose, particularly also heat resistant tool steel in view of a subsequent transfer of pallets 8 to a machine tool for a cutting manufacture or also for thermal post-processing at high temperature, e.g. hot isostatic pressing.

FIGS. 4-6 show a first embodiment of workpiece holder 8 (pallet 8) that is provided in the form of a sandwich-like structure, the pallet 8 being composed of an upper part 57 (herein also "upper element 57") and a lower part 59 (herein also "lower element 59"). Upper part 57 consists of the material required for additive manufacture, i.e. of a material on which a workpiece can be built up from the build material using the respective additive manufacturing process. In contrast, lower part 59 consists of a material having a high strength and a different, more particularly lower thermal expansion as described below for sockets 28 and 42 of the second and third embodiment. The upper part 57 and lower part 59 are connected to each other in a suitable manner. This is preferably achieved in a detachable manner, e.g. by screws 61, as illustrated, which are preferably arranged symmetrically around positioning recess 14. Screws 61 are screwed into corresponding blind holes 63 in upper part 57.

With this construction it has been observed that a lower temperature gradient occurs within upper part 57 and a correspondingly lower tendency to forming a curved surface. Another factor counteracting a curvature may be lower part 59 which, as a stiff and temperature-stable element, counteracts the formation of a concave curvature on the lower side of upper part 57. For a precise relative positioning of lower part 59 and upper part 57 during their assembly, a first positioning bolt 65 in lower part 59 is suggested which can be inserted in a precisely fitting first positioning hole 67 in upper part 57. Spaced apart from positioning bolt 65, lower part 59 comprises a second positioning bolt 69 that is intended to be inserted into a second positioning hole. Positioning hole has the particularity that it is lengthened in the direction of the connecting line to first positioning hole 67 and thus exhibits an oval cross-section or is provided in the form of an oblong hole. In this manner, the different thermal expansions of upper part 57 and lower part 59 on heating of pallet 8 are compensated without applying stresses to second positioning bolt 69. In the case of larger pallets 8 it may become necessary to provide additional positioning bolts and holes that are laterally offset from the connecting line between the first positioning bolt 65 and the second positioning bolt 69. In this case, third positioning holes (not shown) have to be provided for the latter, which have a larger cross-section than the respective positioning bolts in order to allow a displacement in any direction in the xy plane. Likewise, holes 63 for screws 61 in lower part 59 are oversized with respect to the shanks of screws 61 so that the screw heads of screws 61 and their shanks are capable of being displaced in lower part 59 according to the relative thermal expansion of upper part 57.

A workpiece holder 8 (pallet 8) according to a second embodiment of a support system is shown in FIG. 7. Body 9 of pallet 8 entirely consists of a material that is suitable as a carrier material for additive manufacturing. On its upper side, body 9 defines the surface of pallet 8 on which the workpiece can be built. In the lower side of body 9, a cylindrical recess 32 is made which is provided with an internal thread 26. A socket 28 made of tool steel, substantially in the shape of a ring, is screwed into thread 26. Socket 28 has a rotational locking recess 30. In the present case, two diametrically opposed rotational locking recesses 30 are provided in socket 28 which serve for the engagement of a screwdriver for screwing in and loosening socket 28.

Recess 32 receiving socket 28 is limited by a relatively thin cylinder wall 36 that is surrounded by an expansion gap 38. If necessary, cylinder wall 36, which is also provided with thread 26 on its inner side, is undersized with respect to the circumference of socket 28 in order to compensate a possible higher thermal expansion of the material of body 9 of the lower element relative to the material of socket 28 under the production conditions. In particular, the undersize is chosen such that socket 28 is held in thread 26 securely and without play at the highest assumable temperature during the additive manufacture.

It shall be noted with regard to this solution that socket 28 and correspondingly the threads 26 in pallet 8 have to be made with high precision since socket 28 and rotational locking recess 30 have to be precisely positioned.

During machining, where higher forces are applied to pallet 8, socket 28 serves as an engagement means for the anchorages that are usual in this process, e.g. pins having extendable balls or claws. It is also possible to remove socket 28 during process steps where it would interfere or which it cannot withstand, e.g. hot isostatic pressing.

Figure 8:
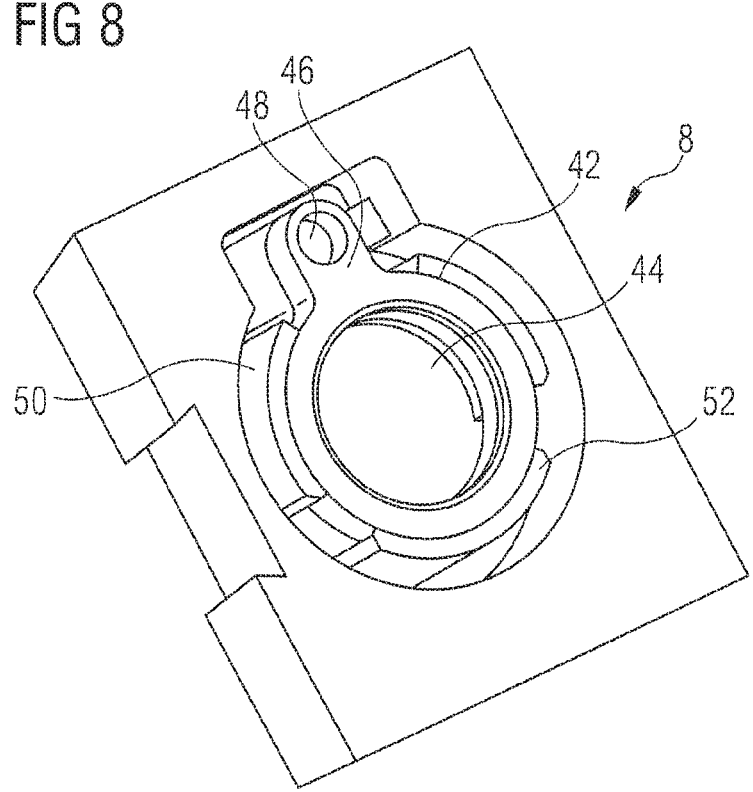
FIG. 8 isometric view from below of a workpiece holder according to FIG. 3c with a third embodiment of a positioning device.
Figure 9:
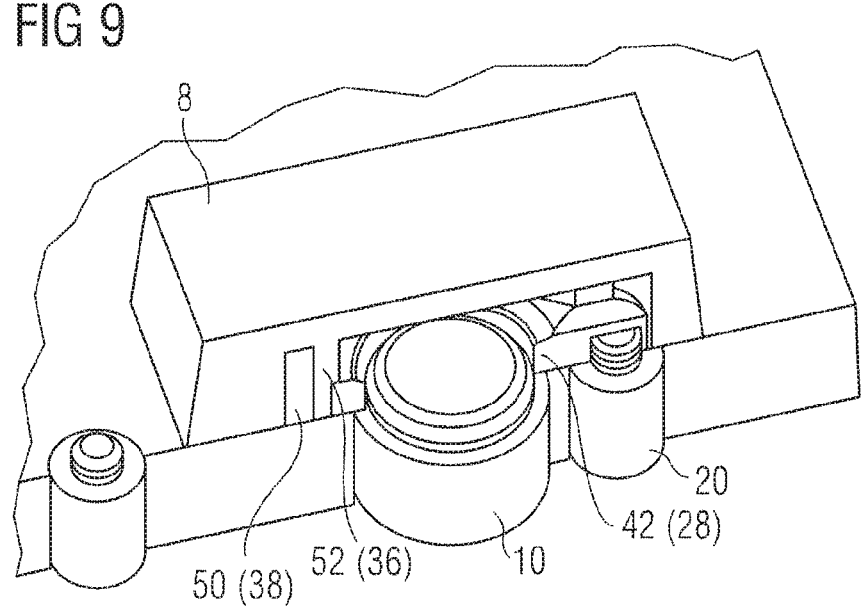
FIG. 9 enlarged illustration of workpiece holders on a base plate and partial section of a positioning device according to FIG. 8.

In the third embodiment according to FIG. 8, a socket 42 is press-fitted into recess 44 in pallet 8. Socket 42 has a nose 46 in which rotational locking recess 48 is located. Here also, an expansion gap 50 is provided in order to reduce strains that might occur due to different thermal expansion coefficients of the body of pallet 8 and socket 42. Wall 52 into which socket 42 is press-fitted is designed such that it also retains socket 42 at the highest occurring temperatures at least without play, even in the case of a higher thermal expansion of the body of pallet than that of socket 42.

As described in the preceding second exemplary embodiment, socket 42 consists of heat-resistant tool steel and the body of pallet 8 of a material that is suitable as a carrier material for additive manufacturing (e.g. aluminum or an aluminum alloy).

In this embodiment, the position of rotational locking opening 48 is predetermined, but a precise positioning in the vertical direction (z direction) must be ensured while socket 42 is pressed in. To ensure that this positioning is preserved even at the highest occurring temperatures, a higher prestress has to be provided here, i.e. an undersize of wall 52 relative to socket 42, whereby the material is subject to higher loads.

Otherwise, with regard to its fastening during machining and removal, the explanations given above with respect to socket 28 apply.

Figure 10:
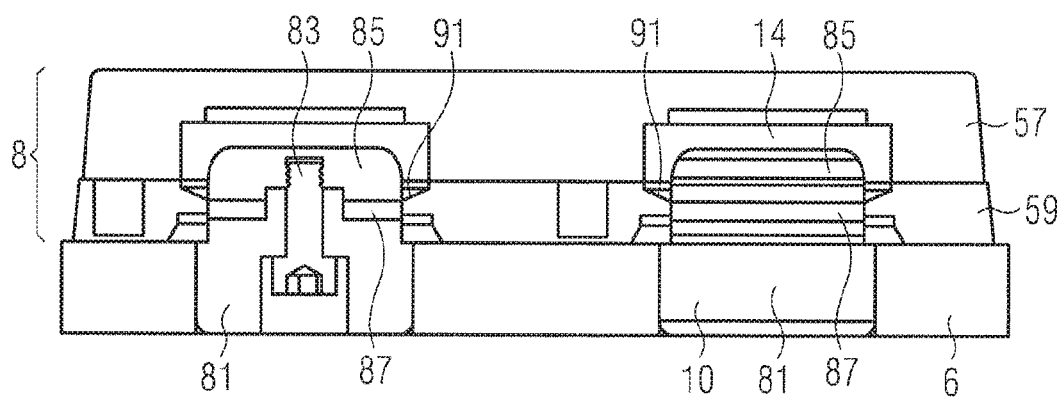
FIG. 10 Cross-section of an arrangement of a workpiece holder according to FIG. 4 on a base support with positioning pins, sectional and non-sectional views.

FIG. 10 shows a preferred embodiment of pins 10. More precisely, FIG. 10 shows an embodiment where a workpiece holder 8 is attached to a base support 6 by means of pins 10 and associated recesses 14. Workpiece holder 8 may be one of the foregoing embodiments, in particular a workpiece holder of the first embodiment according to FIGS. 4-6. On a pin base 81, a pin cover 85 is fastened by means of a screw 83. Between pin base 81 and pin cover 85, a ring 87 of a material having a higher thermal expansion (higher thermal expansion coefficient) than the lower element 59 of workpiece holder 8 of the first exemplary embodiment (as shown here) or sockets 28 resp. 42 of the other embodiments is clamped. An aluminum alloy is preferred for this purpose. In particular, ring 87 is arranged so as to precisely abut to sockets 28 resp. 42 or, as shown here, to an annular collar 91 of lower element 59. When a pallet 8 is placed on a base support 6, pins 10 slide into recesses 14 on the pallets with as little play as possible but still easily. In the event of temperature increases, ring 87 expands more than the surround material, whereby the pallet (workpiece holder) 8 is retained on base support 6 with increasing force.

Alternatively to the above-described embodiment of pins 10, a material having a higher thermal expansion may also be provided at the edges of the hole. In particular, a retaining section 28, 42, 91 of the hole (14) may be formed of a material having a higher thermal expansion coefficient than the material of a section of pin 10. In the case of the first embodiment, this means that collar 91 of the hole and possibly the entire lower element 59 are formed of the material having a higher thermal expansion coefficient. In the case of the second and third exemplary embodiment, this means that socket 28 or socket 42, respectively, are formed of the material having a higher thermal expansion coefficient. According to this alternative, when the support system heats up, the surrounding hole 14 expands in the negative radial direction toward pin 10 so that the desired clamping effect is achieved.

Collar 91 also serves for the engagement of a fixing device during subsequent cutting processing steps in analogy to sockets 28 and 42. If a treatment is unfavorable for the material of the lower part, e.g. due to excessive temperatures, the lower part can be removed.

Particularly in additive manufacturing processes, where a powder is applied layer by layer in a planar manner, it should be avoided that voids or other irregularities are created in the layers. Consequently, the spaces between pallets 8 and the wall of build cylinder 2 have to be uniformly filled with the build material powder in a reliable manner. Another effect is the thermal expansion or shrinkage, respectively, during the manufacturing process. When the pallets 8 expand, it has to be ensured that the build material powder may move out of spaces whose size diminishes due to this process. On the other hand, in the event of a reduction in size of the pallets, it must be ensured that the powder may fill the now again increasing spaces in a manner that rather corresponds to the flow of a liquid so that it is certain, at least after applying a powder layer and smoothing it, that no further displacements or movements occur in the powder, i.e. that the system is stable.

In order to fulfill these requirements, a frustopyramidal shape of the pallets has been found to be suitable. The side walls of pallets 8 in the exemplary embodiments are inclined such that the pallets taper from their lower side 12 toward their upper side 11. This results in a kind of funnel effect which on one hand allows the powder to give way when the spaces between the pallets or between the pallets and the cylinder wall diminish, and on the other hand, ensures a safe, unopposed supply in the case of an increase in size of these spaces.

From another perspective, undercuts or cavities should be avoided for the mentioned reason. In particular, this excludes gaps between the lower side 12 of the pallets and the surface of the base support 6 for engaging a gripper under a pallet. The beveled side walls 95 make it even more difficult so seize the pallets. For secure gripping, a gripping groove 97 is therefore provided on at least one side wall 95. Its side walls 98 are perpendicular or preferably slightly undercut so that gripping groove 97 is dovetailed and offers hold for a suitable gripper. On account of the relatively small dimension of gripping grooves 97, their nearly perpendicular orientation, and a limited undercut for achieving the dovetail shape, they do not constitute a risk with regard to irregular powder coating.

A particularity especially of the methods using targeted melting of material in powder form is that during the removal of the workpiece, material is also removed from the surface of the building carrier. In the first embodiment, a further advantage in this respect is that upper part 57 is easy to exchange. In this regard it is even conceivable to make upper part 57 smaller so that gripping groove 97 is only provided in lower part 59 from tool steel. In this way the shape of upper part 57 is substantially simplified, i.e. a truncated pyramid with straight, uninterrupted side walls.

But it is also conceivable in this regard to compensate the loss of material of pallet 8 in upper part 57 in another manner, e.g. also by an interposed additive manufacturing step by which the material loss is compensated by the growth of new material.

In the exemplary embodiments described above, base support 6 comprises at least one pin 10 and workpiece holder 8 at least one hole 14. However, in alternative exemplary embodiments, the pin/hole pairs may be arranged in a reversed configuration so that base support 6 has at least one hole and workpiece holder 8 at least one associated pin. In these exemplary embodiments, the aforementioned clamping effect is also achieved in the aforementioned manner. As to the remaining aspects, these exemplary embodiments are similar to those described above. Furthermore, a plurality of pin/hole pairs may be provided in such a manner that base support 6 comprises both pins and holes and workpiece holder 8 comprises associated holes and pins.

In summary, together with base support 6, the described pallets (workpiece holders) 8 provide a support system by which it is possible to transfer a workpiece along with the pallet between an additive manufacturing system and systems for other treatments of the workpiece (cutting, heat treatment, cleaning, measuring) in a simple manner, particularly also by means of a robot. All in all, this results in a considerable rationalization potential. By a suitable construction of the pallets, negative effects, either due to thermal expansion or the risk of uneven powder coating, have been avoided. Thus, in a process, e.g. a workpiece holder 8 can be transported in an automated manner from a system (more precisely from a base support 6 of the system) for additive manufacture (e.g. a beam melting system for selective laser melting) to a system for the subtractive processing of the manufactured workpiece. Optionally, in an intermediate step, workpiece holder 8 together with the workpiece can be positioned in a system for thermal post-processing.

By means of the support systems of the first to third embodiments described herein, a method for producing a workpiece can e.g. be carried out as follows. First, workpiece holder 8 of the support system according to one of the embodiments is placed on base support 6 of the support system in a manufacturing device of the additive kind. In this step, pin 10 of base support 6 engages in hole 14 of workpiece holder 8, as shown in FIG. 10. Subsequently, an additive manufacture of a workpiece is carried out on workpiece holder 8 by the manufacturing device. Due to the produced process heat, a temperature of the support system is increased during the manufacturing process. Due to thermal expansion of section 87 of pin 10, a clamping effect results between pin 10 and the surrounding hole 14 since the material of section 87 has a higher thermal expansion coefficient than the material of hole 14 in workpiece holder 8 that surrounds section 87. Alternatively, a clamping effect results between pin 10 and the surrounding hole 14 due to an expansion of retaining section 28, 42, 91 since according to the alternative, the material of retaining section 28, 42, 91 has a higher thermal expansion coefficient than the material at least of section 87 of pin 10.

After carrying out the additive manufacture, the support system cools down and the clamping action is released. Subsequently, workpiece holder 8 together with the workpiece produced thereon is removed from base support 6 and transported to a system for subtractive post-processing of the workpiece. Workpiece holder 8 is placed on a support of the system for the subtractive post-processing, where a pin 10 of the support engages in hole 14 of workpiece holder 8. Alternatively, the workpiece placed on workpiece holder 8 may undergo one or several intermediate manufacturing steps between the additive and the subtractive manufacture, e.g. a thermal post-processing step in a corresponding system which also comprises, similarly as the systems for the additive and subtractive manufacture, a base support having corresponding pins.

By way of examples, heat treatments for different materials that are suitable for additive manufacturing and corresponding pallet surfaces shall be indicated:

Aluminum alloy: heat treatment in the range of approx. 200° C. to approx. 500° C., preferably approx. 400° C. to approx. 540° C.

Titanium alloys: heat treatment in the range of approx. 400° C. to approx. 995° C. (depending on the alloy type), preferably approx. 480° C. to approx. 730° C.

Preferably, pallets 8 and base support 6 are characterized by the following numerical values:

Inclination of side walls 95: 1°-11°, preferably 3° to 9°, 5° to 7°, or about 6°. Greater angles entail a noticeable reduction of the surface area that is available for the manufacture, in particular. Smaller angles entail the blockage of the powder and general ineffectiveness. In particular, in the case of an angle that is too small, the powder is also enclosed in interstices and can no longer escape upwardly when they diminish due to thermal expansion.

The height of upper part 57 amounts to ¼ to ¾ of the total height of a pallet. However, a height of at most half of the pallet height is preferred.

Side walls 98 of gripping groove 97 are each inclined 10° to 40°, preferably 10° to 20°, more preferably 15° to 20° relative to the bottom of gripping groove 97 while a preferred value is about 15°. The depth of the gripping grooves may be comprised between 3 mm and 6 mm, a preferred value being 4 mm. 1 mm may be assumed to be the extreme lower limit.

Height of the pallets: 25 mm to 35 mm.

Hardness of the positioning parts (sockets 28, 42; lower part 59; possibly also base support 6): approx. 45 to approx. 68 HRC (Rockwell hardness C), preferably approx. 50 to approx. 55 HRC.

From the preceding description of exemplary embodiments, modifications and complements are accessible to one skilled in the art without leaving the scope of the invention that is defined by the claims. Conceivable are, among others:

- Base support 6 may be equipped with a peripheral rim that provides in particular a transition between the build cylinder wall, which has rounded corners, and the sharp corners of the pallets and thus saves build material that would otherwise have to be filled in to fill the resulting relatively large gap between the side walls of the pallets and the build cylinder wall.
- In this context, detachable or non-detachable connections are conceivable.
- The rotational locking provisions may be omitted in pallets having at least 2 positioning means (recesses 14).
- Pallet 8 has more than one gripping groove 97, e.g. on more than one side, preferably on opposite sides, or more than one groove 97 on one side. The latter may be advantageous in the case of larger pallets. It is also conceivable to provide gripping grooves at the corners of the pallets, i.e. to provide at least one corner with a gripping groove.
- Instead of a gripping groove, the inverse means is provided, namely a ridge having a constant width or a width that decreases toward the pallet body.
- In the second positioning devices, an oblong hole 71 has a length that is at most 0.4 mm greater than its width, and a hole having a larger diameter ("third positioning hole", additionally or alternatively to oblong hole 71) has a diameter that is at most 0.4 mm larger than the first (positioning) hole 67.

Figure 11:
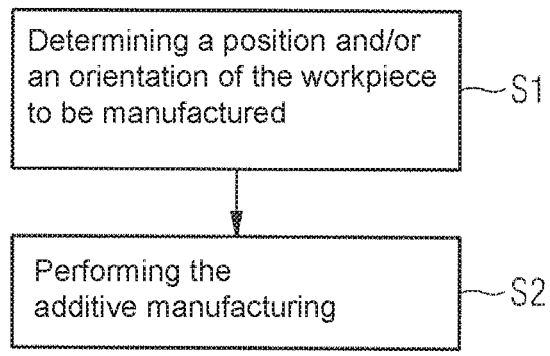
FIG. 11 embodiment of a method for producing a workpiece according to a manufacturing process of the additive kind.

In FIG. 11, a method for producing a workpiece in a manufacturing process of the additive kind is illustrated. The method may e.g. comprise an additive manufacture by means of one of the manufacturing devices described herein. In particular, the method may comprise an additive manufacture of a workpiece on one of the workpiece holders 8 described herein (in particular on workpiece holder 8 according to the first embodiment).

The method according to FIG. 11 may e.g. be carried out by a control device of a manufacturing device of the additive kind. The method may also be provided by a central control device or a central computer controlling both the manufacturing device of the additive kind and a device for a subtractive post-processing. The control device and/or the computer carrying out the method comprises a processor for carrying out the individual process steps and a memory in which program instructions for the individual process steps are stored.

According to a first step S1, the method comprises determining a position and/or orientation of the workpiece to be produced relative to a workpiece holder 8 on which the workpiece is additively manufactured while taking into account digital part data defining a geometry of the workpiece and while taking into account conditions defined by subtractive post-processing of the workpiece. According to a second step S2, the method comprises carrying out the additive manufacture of the workpiece on workpiece holder 8 based on the determined position and/or orientation of the workpiece.

Hereinafter, further (partly optional) details of the method shown in FIG. 11 are explained.

According to one embodiment, the manufacturing process of FIG. 11 comprises the following steps:

1.) Part import from CAD
2.) Configuration of the additive production machine in accordance with the palletizing system/support system
3.) Part preparation for additive manufacturing (including step S1)
4.) Part preparation for further subtractive treatment
5.) Generation of the necessary machine control files (both additive and subtractive)
6.) Definition of quality assurance criteria
7.) Initiation of all manufacturing processes (including step S2)

Regarding step 1.) The method starts with the import of a digital part from a corresponding CAD (Computer Aided Design) program or a connected PLM (Product Lifecycle Management) system, respectively. To this end, both native file formats, lightweight data, and neutral exchange formats may be used. By way of examples, the formats *.prt, *.CATPart, *.step, *.igs, *.stl, JT, PVX, etc. may be mentioned. Subsequently, based on this geometry, the preparation of the additive building process follows under the aspects of the subtractive post-processing in step 3.) This includes the possibility of varying the existing CAD part based on the specific post-processing (e.g. oversize allowance in view of implementing the post-processing).

Regarding step 2.) According to the geometrical characteristics of the CAD part or parts to be manufactured, the possible building space of the additive manufacturing machine is configured. The size and material variants discussed with regard to the embodiments of workpiece holder 8 and base support 6 are available for selection. The configuration of the building space can be customized according to the requirements of the additive manufacture under the aspects of gas flow, coater direction, and scan strategy. The configuration also includes taking into account an automated analog process chain using industry robots for process optimization (e.g. the orientation of gripping groove 97 discussed above).

Regarding step 3.) The preparation of the part for its additive manufacture includes the steps of defining the position of the parts within the building space (according to step S1) and the corresponding palletizing, as well as the definition of possible support materials for the additive manufacture of the part and the definition of the exposure strategy and the layer thickness of the additive manufacturing process.

a.) Position definition: The orientation of the part in the building space of the machine has to be defined under the aspects of the subtractive post-processing. This includes taking into account the subtractive process steps (e.g. counterboring, drilling, surface grinding, roughing, tapping, etc.), the tools required for carrying out these post-processing steps, and resulting constraints such as milling forces or torques, vibrations, etc., as well as the materials being used. This information may be provided both manually and in an automated manner on the basis of internal strategies, databases or the like provided by the operator. For an optimum orientation of the workpieces in the building space, an attainability analysis of the areas to be machined is carried out on the basis of the defined subtractive tools. Among others, this includes the factors of machine kinematics, tool geometry, tool linking, etc. The quality of particular orientations is visualized to the operator in the form of a false color representation. Furthermore, this representation can be combined with further quality criteria regarding part warpage, minimum support geometry complexity, additive building time, etc., and individually weighted.

b.) Support material: Based on the defined subtractive process steps, the calculation of a suitable support geometry is carried out. The latter is designed such that resulting forces, torques, vibrations, etc. are accordingly absorbed and withstood. Weighting again follows the aspects of minimizing the complexity of the support geometry. Strategies being applied include the simulative assessment on the basis of topology optimization as well as machine learning processes on the basis of evaluated previous manufacturing processes.

c.) Exposure strategy and layer thickness of the additive manufacturing process: The production of the individual layers and the associated exposure strategy include the defined subtractive process steps. This allows the local adaptation of the obtained material properties of the additively manufactured workpiece for easier subtractive post-processing. The corresponding benefit lies in the gentle removal of support material and in a high-quality preparation of the volume for high-precision post-processing.

Regarding step 4.) The definition of the additive manufacturing steps is followed by the definition of the CAM (Computer Aided Manufacturing) paths according to known strategies. For this purpose, reference is made to the chosen orientation of the additive workpiece and the defined tool list. The resulting displacement paths within the individual processing paths are checked for validity and generated as neutral G code.

Regarding step 5.) Based on the defined additive as well as subtractive process steps, the corresponding machine control files are generated. This includes both the creation of the build file for the corresponding additive manufacturing machine and the translation the neutral G code into the format required for the particular subtractive processing machine or its control system, respectively. The definition of these steps is not limited to subtractive post-processing steps but may be analogously applied to tactile or optical measuring methods. Therefore, this process step allows both the definition of the post-processing steps and the definition of automated quality assurance measures.

Regarding step 6.) Besides the preceding steps, a definition of further quality assurance criteria is also possible. This includes:

a.) The definition of an unambiguous assignment of the respective parts or pallets/workpiece holders to particular manufacturing tasks in the form of an unambiguous identification by means of QR codes, structural adaptation, etc.

b.) The collection and evaluation of process-relevant sensor data (analog, digital, optical, etc.) for the accompanying monitoring of the additive manufacture and the resulting part quality.

c.) The definition of measuring points for the automated measurement of the additively manufactured blank. This measurement, combined with a comparison to the digital target, results in a recalibration of the subtractive post-processing, if necessary.

Regarding step 7.) Finally, the manufacture starts and according to step S2, the additive manufacturing process (e.g. selective beam melting) is carried out first. For this purpose, the previously defined data is used. Then, optionally, follows a thermal post-processing step and ultimately at least one subtractive post-processing step of the workpiece. In an exemplary embodiment, the workpiece remains on the workpiece holder during the additive manufacture and during the subtractive post-processing. The workpiece holder may be one of the previously described workpiece holders of the first to third embodiments.

The above-described method according to FIG. 11 allows making use of the advantages of the support systems and their workpiece holders 8 according to the above-described embodiments. This applies both to the digital preparation and to the analog process chain for the real implementation of the manufacture. The overall process chain includes the integration, combination, and monitoring in the sense of a Smart Factory. Beginning with the digital component starts the life cycle which continuously mirrors the entire manufacturing process up to the safe disposal in the sense of a PLM (Product Lifecycle Management) solution. Thanks to this seamless integration, the production can be implemented in a lean manner and without the risk of redundant steps, versions, or interim solutions.

The above-described method thus reduces the administrative and operative effort. Likewise, the regulatory effort in the sense of a validation according to guidelines e.g. in aviation or medical technology etc., is reduced to an overall integration chain.

The invention claimed is:

1. Support system for a manufacturing system, comprising:
   a base support (6) that is arranged to be secured in a process chamber of the manufacturing system and comprises at least one positioning element; and
   a workpiece holder (8) on which a workpiece can be produced according to a manufacturing process including the layered application of a raw material in powder form, wherein
   the workpiece holder (8) has a lower side (12) and a building side as an upper side (11) which is located substantially opposite the lower side (12),
   on the lower side (12), the workpiece holder (8) has at least one first positioning device for releasable, positionally accurate attachment to the base support (6) of the support system,
   the at least one positioning element (10) and the at least one first positioning device (14) are designed in a complementary manner and form a pin/hole pair comprising a pin and a hole,
   at least one section (87) of the pin is made of a first material having a first thermal expansion coefficient, and a retaining section (28, 42, 91) of the hole that is decisive for the positioning accuracy is made of a second material having a second thermal expansion coefficient, and
   wherein the second thermal expansion coefficient is lower than the first thermal expansion coefficient such that a clamping effect results between the pin and the surrounding hole in the event of a temperature increase of the support system during the manufacturing process due to the expansion of the section (87) of the pin, or
   wherein the first thermal expansion coefficient is lower than the second thermal expansion coefficient such that a clamping effect results between the pin and the surrounding hole in the event of a temperature increase of the support system during the manufacturing process due to the expansion of the retaining section (28, 42, 91) of the hole.

2. The support system according to claim 1, wherein
a workpiece can be produced on the workpiece holder according to an additive manufacturing process including the layered application of a raw material in powder form,
the workpiece holder (8) has a lower side (12) and a building side as an upper side (11) which is located substantially opposite the lower side (12),
on the lower side (12), the workpiece support (8) has at least one of the first positioning devices (14) for its releasable, positionally accurate attachment to the base support (6) of the manufacturing device,
the workpiece holder (8) comprises a plate-shaped upper element (57) and a plate-shaped lower element (59),
the upper element comprises the upper side (11) and the lower element comprises the lower side (59), and
the upper element (57) is made of a different material than the lower element (59).

3. The support system according to claim 2, wherein
a workpiece can be produced on the workpiece holder according to an additive manufacturing process including the layered application of a raw material in powder form,
the workpiece holder (8) has a lower side (12) and a building side as its upper side (11) which is located substantially opposite the lower side (12),
on its lower side (12), the workpiece support (8) has at least one of the first positioning devices (14) for releasable, positionally accurate attachment to the base support (6) of the manufacturing device, and
the upper side (11) consists, at least on a surface thereof, of a building carrier material that is compatible with a part building material of the additive manufacturing process so that a workpiece can be additively produced on the workpiece holder (8) from the build material while being connected to the surface of the upper side and the workpiece holder (8) is removable together with the workpiece from the base support (6).

4. The support system according to claim 2, wherein the lower element (59) and the upper element (57) are detachably connected to each.

5. The support system according to claim 2, wherein starting from the upper side (11), at least ¼ of the height of the workpiece holder (8) forms the upper element (57), and starting from the lower side (12) up to the upper element (57) at most, the lower element (59) extends, in which at least part of the first positioning device (14) is provided in the form of a hole.

6. The support system according to claim 2, wherein the second material exhibits at least one of the following two properties:
heat resistant up to 550° C.,
hardness in the range of 45 to 68 HRC (Rockwell hardness C).

7. The support system according to claim 2, wherein second positioning devices (67, 71, 65, 69) are provided on the upper element (57) and on the lower element (59) and have a mutually complementary configuration in order to be able to fasten the upper element (57) and the lower element (59) to each other in a positionally accurate manner, and the second positioning devices (67, 71, 65, 69) comprise a set of at least two holes (67, 71) including a first hole (67) and at least one second hole (71), the second hole being shaped as an oblong hole so that a positioning bolt (71) of the second positioning devices inserted therein is displaceable in at least one direction in order to compensate for a thermal dimensional change of the upper element (57) relative to the lower element (59).

8. The support system according to claim 2, wherein the first positioning device is substantially a hole (14), the retaining section (28, 42, 91) of the hole substantially represents an annular portion of the inner wall of the hole.

9. The support system according to claim 8, wherein the first positioning device is substantially a hole (14) and has a circular cross-section, and a second recess (18) that is arranged eccentrically to the hole (14) is provided in the workpiece holder (8), or the hole (14) has an elliptical, oval, or polygonal cross-section so that the workpiece holder (8), when placed on the base support (6) with at least one positioning element (10) of a complementary configuration, is rotationally locked.

10. The support system according to claim 8, wherein the lower element (59) is made of the second material.

11. The support system according to claim 2, wherein lateral surfaces (95) of the workpiece holder (8) between the lower side (12) and the upper side (11) are inclined so that the workpiece holder (8) tapers from the lower side (12) to the upper side (11).

12. The support system according to claim 2, wherein at least one lateral surface of the workpiece holder (8) may comprise at least one gripping means in the form of a groove or a ridge.

13. The support system according to claim 12, wherein the gripping means (97) is designed in the form of a groove having a dovetail cross-section.

14. Support system for a manufacturing system, comprising:
a base support (6) that is arranged to be secured in a process chamber of the manufacturing system and comprises at least one positioning element; and
a workpiece holder (8) on which a workpiece can be produced according to a manufacturing process including the layered application of a raw material in powder form, wherein
the workpiece holder (8) has a lower side (12) and a building side as an upper side (11) which is located substantially opposite the lower side (12),
on the lower side (12), the workpiece holder (8) has at least one first positioning device for releasable, positionally accurate attachment to the base support (6) of the support system,
the at least one positioning element (10) and the at least one first positioning device (14) are designed in a complementary manner and form a pin/hole pair comprising a pin and a hole,
at least one section (87) of the pin is made of a first material having a first thermal expansion coefficient, and a retaining section (28, 42, 91) of the hole that is decisive for the positioning accuracy is made of a second material having a second thermal expansion coefficient, and
wherein the second thermal expansion coefficient is lower than the first thermal expansion coefficient such that a clamping effect results between the pin and the surrounding hole in the event of a temperature increase of the support system during the manufacturing process due to the expansion of the section (87) of the pin, or
wherein the first thermal expansion coefficient is lower than the second thermal expansion coefficient such that a clamping effect results between the pin and the surrounding hole in the event of a temperature increase of the support system during the manufacturing process due to the expansion of the retaining section (28, 42, 91) of the hole, wherein the workpiece holder (8) is designed according to claim 2.

15. Manufacturing device of the additive kind using a manufacturing process including the layered application of a raw material in powder form comprising a building stage and a support system according to claim 1, wherein the building stage of the manufacturing device comprises the base support (6) of the support system.

16. The manufacturing device according to claim 15, wherein the base support (6) comprises an arrangement of positioning elements, wherein the arrangement of positioning elements includes the pins (10) and wherein at least one of the pins has either a circular cross-section and additionally each at least one rotational locking pin (20) or an elliptical, oval, or polygonal cross-section so that the workpiece holder (8), when placed on the base support (6), is rotationally locked.

* * * * *